United States Patent
Yun et al.

(10) Patent No.: US 8,339,370 B2
(45) Date of Patent: Dec. 25, 2012

(54) DISPLAY DEVICE AND METHOD OF SENSING INPUT POINT USING MAGNETIC FLUID

(75) Inventors: Sang-Jin Yun, Suwon-si (KR); Sang-Bae Lee, Seoul (KR); Geun-Sik Lim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 510 days.

(21) Appl. No.: 12/358,670

(22) Filed: Jan. 23, 2009

(65) Prior Publication Data

US 2009/0189871 A1    Jul. 30, 2009

(30) Foreign Application Priority Data

Jan. 28, 2008  (KR) .................. 10-2008-0008635

(51) Int. Cl.
  *G06F 3/041* (2006.01)
(52) U.S. Cl. ........................................ 345/173
(58) Field of Classification Search ............... None
  See application file for complete search history.

(56) References Cited

U.S. PATENT DOCUMENTS

| | | | |
|---|---|---|---|
| 6,278,439 B1 | 8/2001 | Rosenberg et al. | |
| 2002/0101410 A1* | 8/2002 | Sakata et al. | 345/173 |
| 2006/0143342 A1* | 6/2006 | Kim et al. | 710/73 |
| 2007/0182718 A1* | 8/2007 | Schoener et al. | 345/173 |
| 2007/0229233 A1* | 10/2007 | Dort | 340/407.1 |

FOREIGN PATENT DOCUMENTS

| | | |
|---|---|---|
| JP | 10-255106 | 9/1998 |
| JP | 2000-148393 | 5/2000 |
| JP | 2004-157933 | 6/2004 |

* cited by examiner

*Primary Examiner* — Christopher R Lamb
(74) *Attorney, Agent, or Firm* — NSIP Law

(57) ABSTRACT

A display device and method of sensing an input point using magnetic fluid, the display device including: a touch panel part to receive a user input through a touch at an input point and to calculate a coordinate value of the input point; an electromagnet arrangement part comprising a plurality of electromagnets to generate a magnetic force on one or more electromagnets in a portion corresponding to the coordinate value; and a magnetic fluid part to obtain magnetism at the portion corresponding to the coordinate vale and to project in accordance with the generated magnetic force.

26 Claims, 7 Drawing Sheets

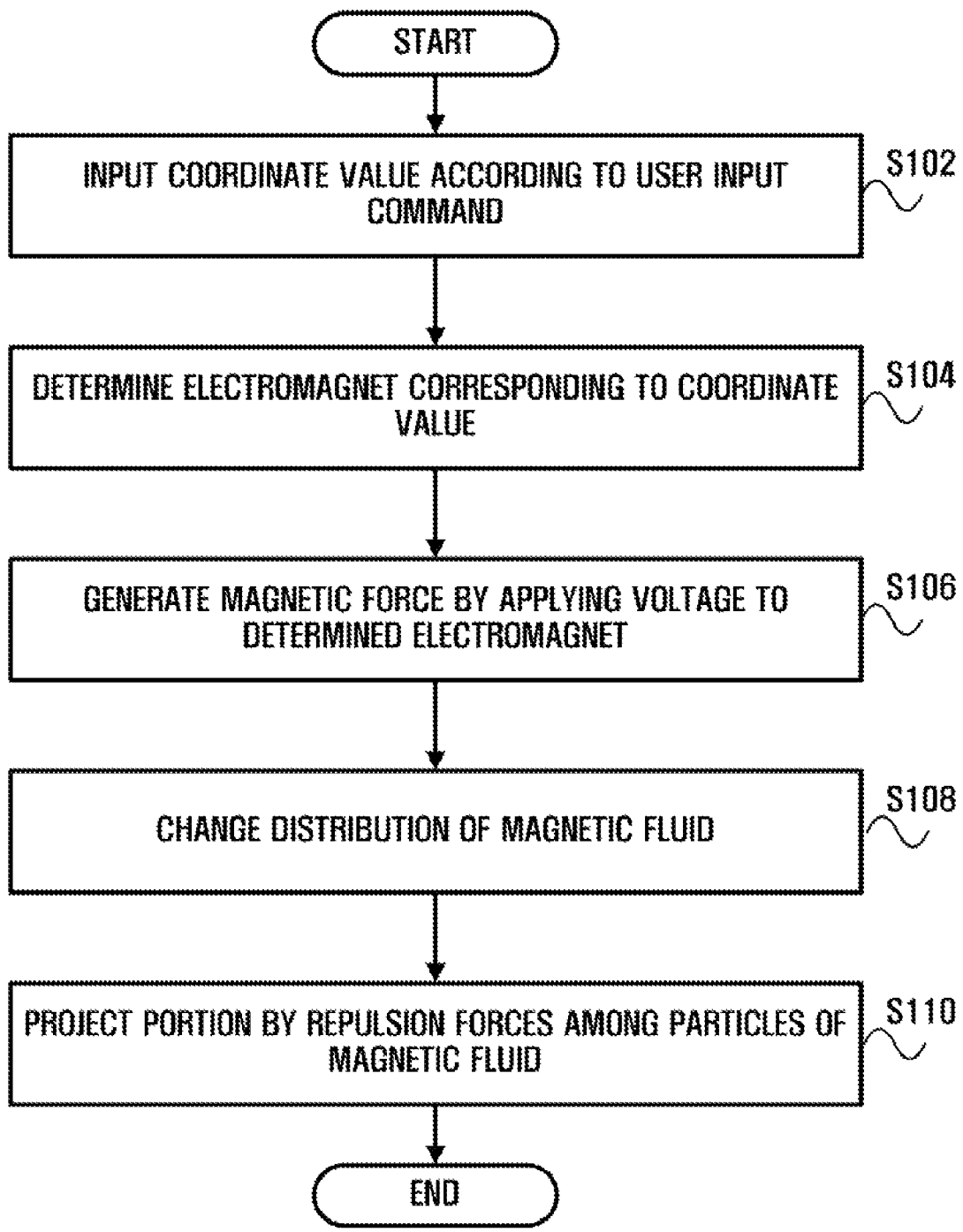

DISPLAY DEVICE AND METHOD OF SENSING INPUT POINT USING MAGNETIC FLUID

CROSS-REFERENCE TO RELATED APPLICATION

This application is based on and claims the benefit of Korean Patent Application No. 2008-8635, filed on Jan. 28, 2008 in the Korean Intellectual Property Office, the disclosure of which is incorporated herein in its entirety by reference.

BACKGROUND OF THE INVENTION

1. Field of the Invention

Aspects of the present invention relate to a technology to input a user command on a touch screen, and more particularly, to a display device and method of sensing an input point using magnetic fluid that causes a user to feel a touch using magnetic fluid when a user input is made on a touch screen.

2. Description of the Related Art

Generally, haptic technology is divided into force feedback, tactile feedback, and thermal feedback. Specifically, force feedback is a technology using kinesthetic information, tactile feedback is a technology using tactile information, and thermal feedback is a technology using thermal information. Conventional technologies generally provide vibrations to a user based on kinesthetic information, and are disclosed in various patent documents (e.g., U.S. Pat. No. 6,278,439, which discloses a method and apparatus to transfer vibrations based on force feedback).

Among them, the force feedback technology using the kinesthetic information is a technology capable of causing a user to feel force and motion using a mechanical interface, and can be easily experienced in daily life. For example, if a gun is fired in a game machine, a repulsion force is actually transferred to a joystick, or if a car collision occurs, a virtual impact is transferred to a steering wheel.

The tactile feedback using tactile information has been widely used in the medical field. For example, a three dimensional (3D) image is displayed in real time on a computer screen, and a user can directly operate an affected part with respect to a virtual patient as the user is looking at a 3D anatomical structure on the computer screen. In this case, the touch, as if the user actually touched skin tissue, is transferred to the user by stimulating a human mechanoreceptor through a device (such as a small pin) that is moved by compressed air or electricity.

Many documents related to the prior art as described above have been disclosed. Korean Patent Unexamined Publication No. 2003-082968 discloses a haptic interface for a laptop computer and other portable devices in which an actuator moves a touch pad surface itself so that a user can immediately sense such movement through his/her skin, and another control region is provided to provide a separate input. Also, Korean Patent Unexamined Publication No. 2002-064603 discloses a human body reaction type touch screen that is provided with screen electrodes that sense a user manipulation by a feedback current flowing to a touch screen, and leads stimulations through the sense of vision, the sense of hearing, and the sense of touch.

FIG. 1 is a view illustrating a structure of a general touch screen according to the prior art. Referring to FIG. 1, the general touch screen includes a plastic film 11, a first electrode 12, a gap 13, a second electrode 14, and an image display part 15. If a user applies pressure onto the plastic film 11 using a finger or a tool (such as a pen or the like), the first electrode 12 and the second electrode 14, which have the gap 13 interposed therebetween, contact each other to generate an electric signal. Such an electric signal is sensed by the image display part 15, and a calculated coordinate value on a screen is used as an input value. In response to such an input value, a screen change or sound is generated as a feedback. According to the conventional touch panel as described above, however, if the screen change or the sound is not generated, it is difficult for the user to recognize whether the signal inputted by the user has been accurately inputted through the touch panel.

SUMMARY OF THE INVENTION

Accordingly, aspects of the present invention address the above-mentioned and/or other problems occurring in the related art, and an aspect of the present invention is to provide a display device and method of sensing an input point using magnetic fluid, which can improve user's input convenience by making a user feel the touch using magnetic fluid, instead of providing a feedback through an existing screen or sound, when a user input is made on a touch screen.

Additional aspects and/or advantages of the invention will be set forth in part in the description which follows and, in part, will be obvious from the description, or may be learned by practice of the invention.

According to an aspect of the present invention, there is provided a display device to sense an input point using magnetic fluid, the display device including: a touch panel part to receive a user input through a touch at an input point and to calculate a coordinate value of the input point; an electromagnet arrangement part including a plurality of electromagnets to generate a magnetic force on one or more electromagnets in a portion corresponding to the coordinate value; and a magnetic fluid part to obtain magnetism at the portion corresponding to the coordinate vale and to project in accordance with the generated magnetic force.

The display device may further include a control part to receive the calculated coordinate value and to determine the one or more electromagnets corresponding to the coordinate value in the electromagnet arrangement part.

According to another aspect of the present invention, there is provided a display method of sensing an input point using magnetic fluid, the display method including: receiving a coordinate value according to a user input on a touch panel device having magnetic fluid; and to magnetize the magnetic fluid existing at a portion corresponding to the coordinate value such as to project the magnetic fluid at the portion.

The magnetizing of the magnetic fluid may include: determining one or more electromagnets corresponding to the coordinate value in an electromagnet arrangement part; generating a magnetic force by applying a voltage to the determined one or more electromagnets; and changing a distribution of the magnetic fluid at the portion corresponding to the coordinate value in accordance with the generated magnetic force such that the magnetic fluid existing at the portion projects in accordance with repulsion forces acting among particles of the magnetic fluid at the portion.

According to another aspect of the present invention, there is provided a computing apparatus to sense an input point using magnetic fluid, the computing apparatus including: a display device to receive a user input, the display device including: a touch panel part to receive the user input through a touch at an input point and to calculate a coordinate value of the input point, an electromagnet arrangement part comprising a plurality of electromagnets to generate a magnetic force on one or more electromagnets in a portion corresponding to a coordinate value of the input point, and a magnetic fluid part to obtain magnetism at the portion corresponding to the coordinate vale and to project in accordance with the generated magnetic force; and a control part to calculate the coordinate value of the input point and to determine the one or more electromagnets corresponding to the coordinate value in the electromagnet arrangement part.

According to yet another aspect of the present invention, there is provided a display device to sense an input point using magnetic fluid, the display device including: a touch panel part to receive a user input through a touch at an input point; an electromagnet arrangement part comprising a plurality of electromagnets to generate a magnetic force on one or more electromagnets in a portion corresponding to the input point; and a magnetic fluid part to obtain magnetism at the portion corresponding to the input point and to project in accordance with the generated magnetic force.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a flowchart illustrating a display method of sensing an input point using magnetic fluid according to an embodiment of the present invention.

DETAILED DESCRIPTION OF THE PREFERRED EMBODIMENTS

Figure 1:
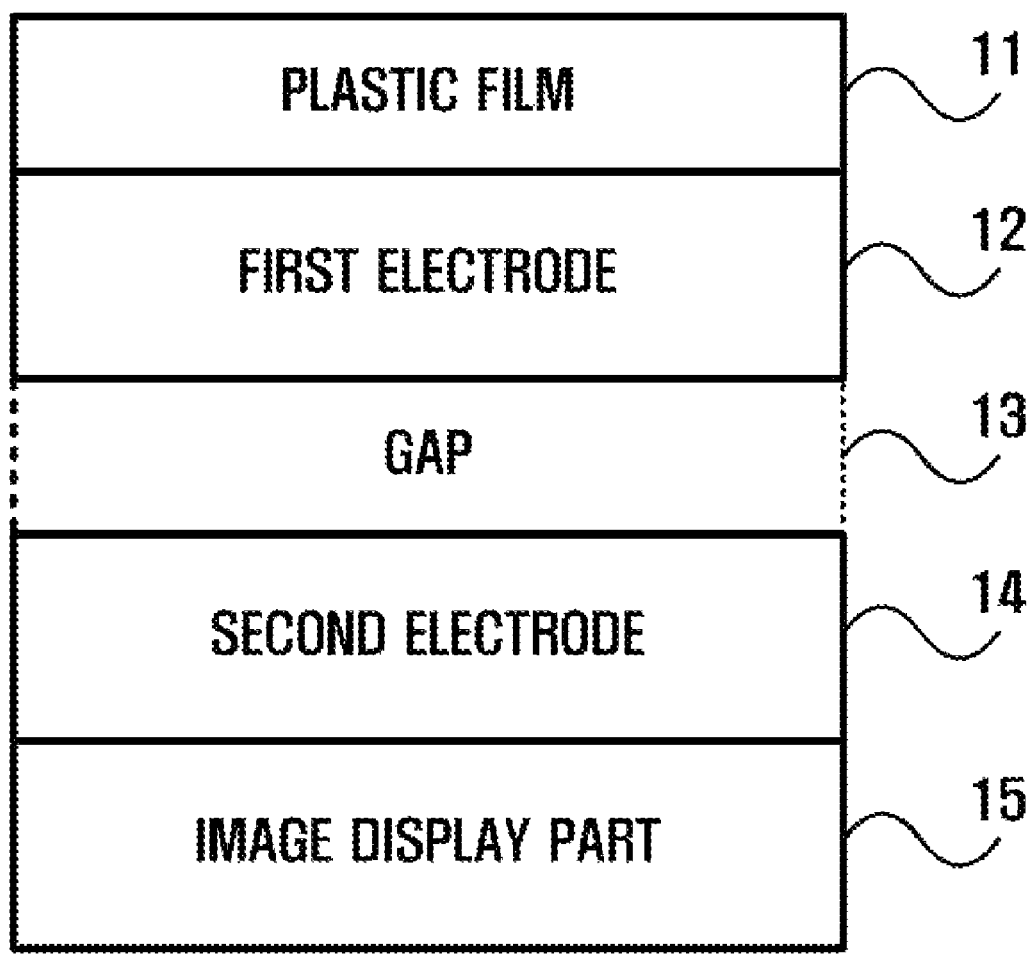
FIG. 1 is a view illustrating a structure of a general touch screen according to the prior art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
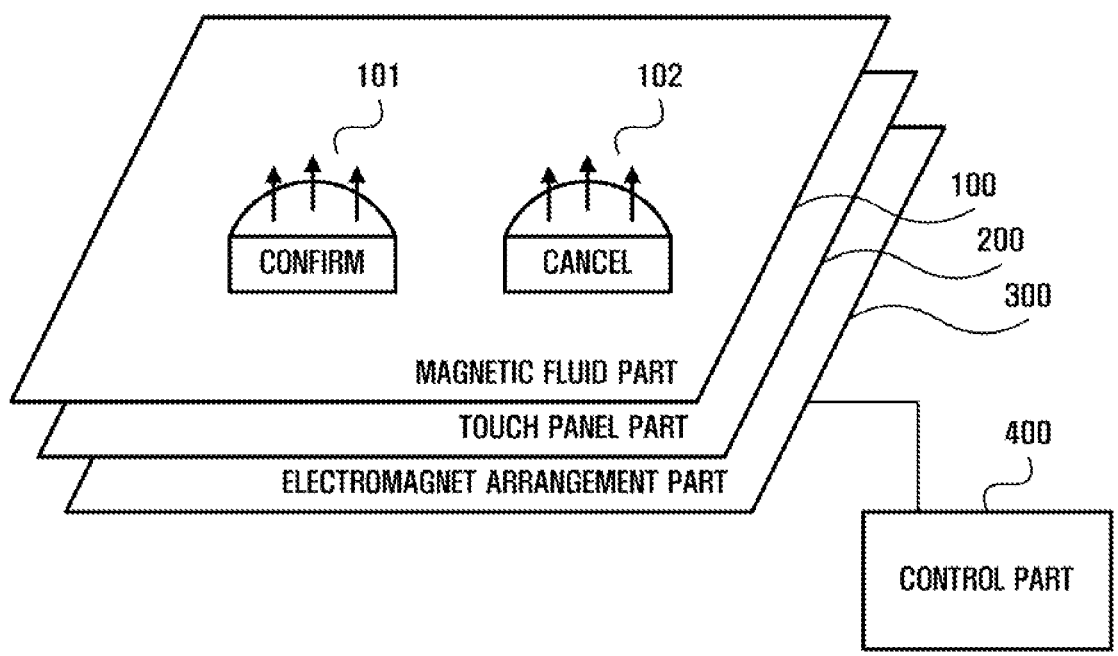
FIG. 2 is a conceptual view explaining a display device to sense an input point using magnetic fluid according to an embodiment of the present invention.

FIG. 2 is a conceptual view explaining a display device to sense an input point using magnetic fluid according to an embodiment of the present invention. Referring to FIG. 2, an electromagnet arrangement part 300, in which electromagnets are arranged in order, is provided under a touch panel part 200. Furthermore, a magnetic fluid part 100, in which magnetic fluid exists, is provided on the touch panel part 200. A control part 400 supplies a voltage to the electromagnet arrangement part 300.

While operating such a display device, if a user pushes a specified point corresponding to a "confirm" button 101 or a "cancel" button 102 using his/her finger or an input device (such as a stylus pen), the touch panel part 200 calculates a coordinate value of the corresponding point and transmits the coordinate value to the control part 400. The control part 400 determines an electromagnet corresponding to the calculated coordinate value in the electromagnet arrangement part 300 and applies a voltage to the electromagnet. Accordingly, the corresponding electromagnet in the electromagnet arrangement unit 300 generates a magnetic force in a vertical direction, and the particles having uniform distribution in the magnetic fluid part 100 are magnetized by the generated magnetic force to disturb the distribution. Accordingly, the magnetic fluid existing at the corresponding point projects convexly in accordance with repulsion forces acting among the particles of the magnetic fluid at that point.

Figure 3:
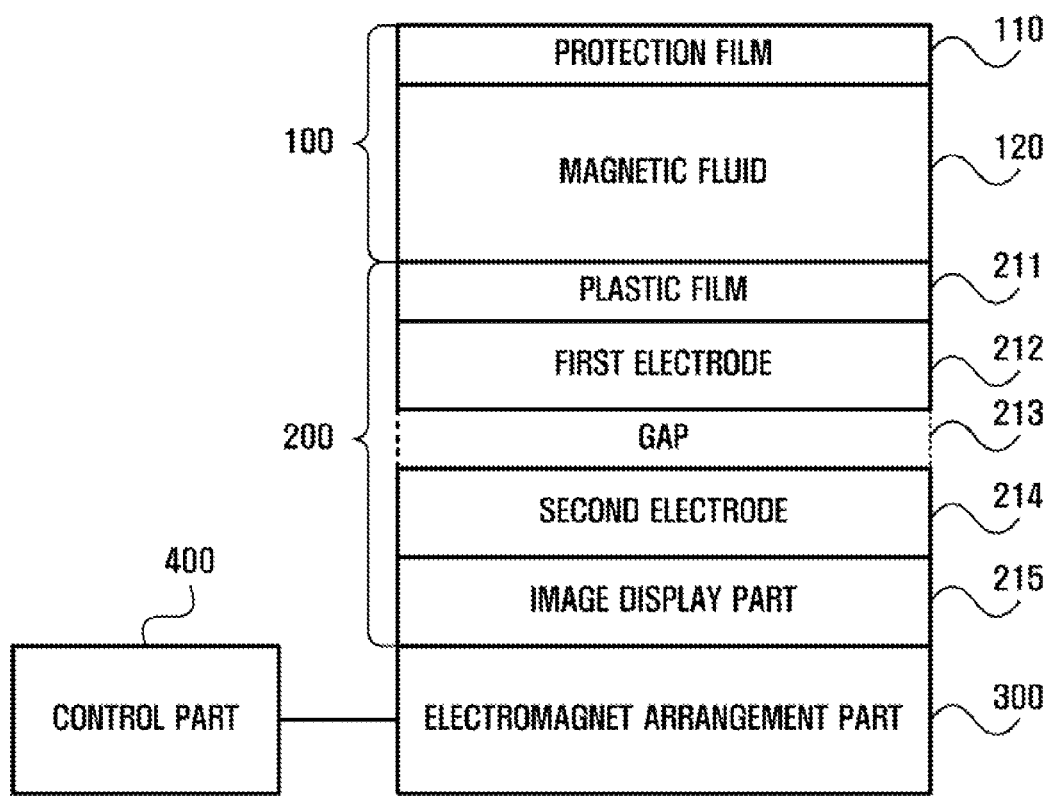
FIG. 3 is a view illustrating a construction of a display device to sense an input point using magnetic fluid according to an embodiment of the present invention.

FIG. 3 is a view illustrating a construction of a display device to sense an input point using magnetic fluid according to an embodiment of the present invention. Referring to FIG. 3, the construction of the display device includes the magnetic fluid part 100, the touch panel part 200, the electromagnet arrangement part 300, and the control part 400.

First, the touch panel part 200 receives a user command through a touch, and calculates the corresponding coordinate value. The touch panel part 200 includes a plastic film 211, a first electrode 212, a gap 213, a second electrode 214, and an image display part 215. If a user applies pressure onto the plastic film 211 using a finger or a tool (such as a pen or the like), the first electrode 212 and the second electrode 214, which have the gap 213 interposed therebetween, contact each other to generate an electric signal. Such an electric signal is sensed by the image display part 215, and a corresponding calculated coordinate value on the screen is transferred to the control part 400 (to be described later as an input value). Here, the pressure applying device may be, but is not limited to, a human finger. For example, any body part other than a finger or an input tool (such as a stylus pen or the like) may also be used as the pressure applying device. However, the present embodiment will be described using a body part such as a finger as an example of the pressure applying device.

The touch panel part 200 may be a device provided with a touch screen, which can directly receive an input user command through a touch panel, and a display device (such as a liquid crystal display (LCD) or a plasma display panel (PDP)), having a tactile feedback operation. The touch panel part 200 may be implemented in various forms. Accordingly, the features and components of the touch panel part 200 are not limited to those as described above, and any display device capable of sensing coordinates input by a user may be adopted as the touch panel part 200.

The control part 400 receives the calculated coordinate value from the touch panel part 200, and finds and/or determines an electromagnet corresponding to the coordinate value in the electromagnet arrangement part 300. Also, the control part 400 applies a voltage to the electromagnet, so that the corresponding electromagnet generates a magnetic force.

The electromagnet arrangement unit 300 is an electromagnet array that may be provided on a lower part of the touch panel part 200. The electromagnet determined by the control part 400 existing in a portion of the electromagnet array corresponding to the coordinate value generates the magnetic force in accordance with the voltage applied from the control part 400. In this case, depending on the integrity of the electromagnets of the electromagnet arrangement part 300, the strength of the magnetic force may differ.

The magnetic fluid part 100 is provided on an upper part of the touch panel part 200, and includes magnetic fluid 120 of which a particle distribution is changed by the magnetic force, and a protection film 110 protecting the magnetic fluid.

The magnetic fluid part 100 forms a uniform distribution of the particles when no voltage is applied to the electromagnet arrangement part 300. Conversely, when a voltage is applied to the electromagnet arrangement part 300, the particle distribution of the magnetic fluid is disturbed as the portion corresponding to the coordinate vale has magnetism by the magnetic force generated from the electromagnet arrangement part 300. Accordingly, repulsion forces are generated among the particles, and the corresponding portion projects (for example, in the form of a button).

The term "part", as used herein, refers to, but is not limited to, a software or hardware component, such as a Field Programmable Gate Array (FPGA) or Application Specific Integrated Circuit (ASIC), that performs certain tasks. A part may advantageously be configured to reside on the addressable storage medium and configured to execute on one or more processors. Thus, a part may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operability provided for in the components and parts may be combined into fewer components and parts or further separated into additional components and parts.

Figure 4:
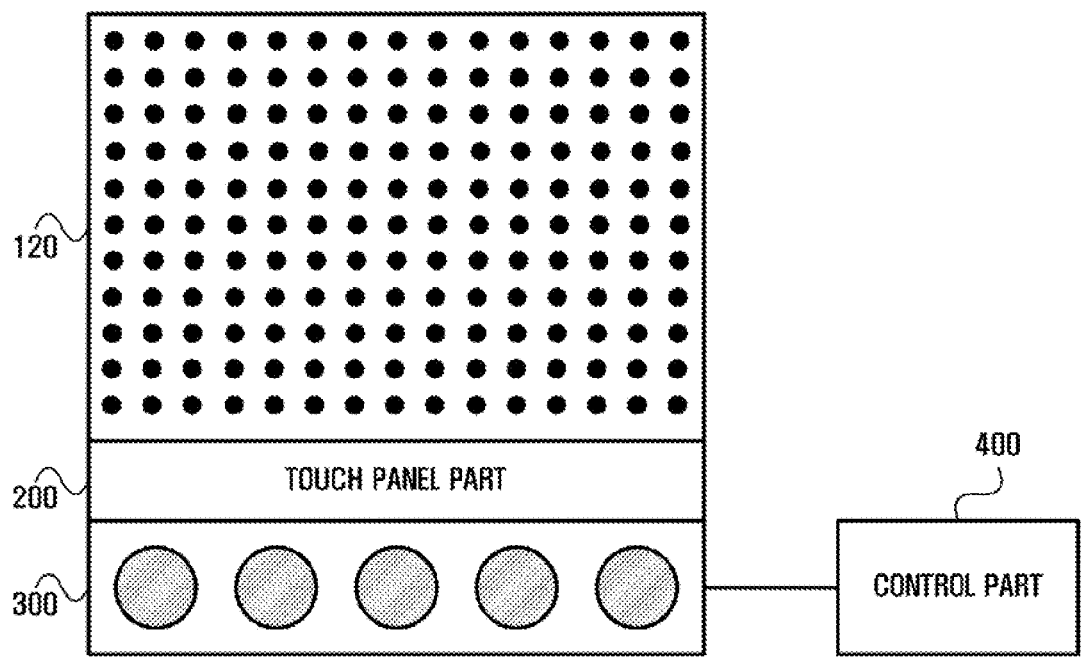
FIG. 4 is a view explaining a distribution of magnetic fluid before a voltage is applied to an electromagnet arrangement part according to an embodiment of the present invention.
Figure 5:
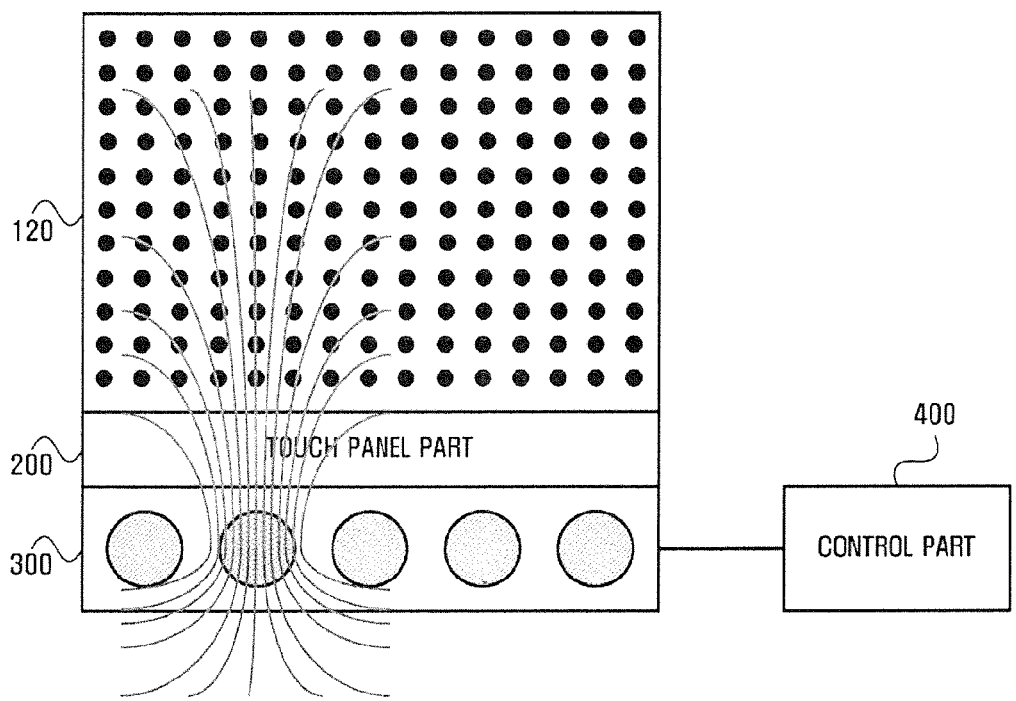
FIG. 5 is a view explaining a case where a voltage is applied to an electromagnet arrangement part and a magnetic force is generated according to an embodiment of the present invention.
Figure 6:
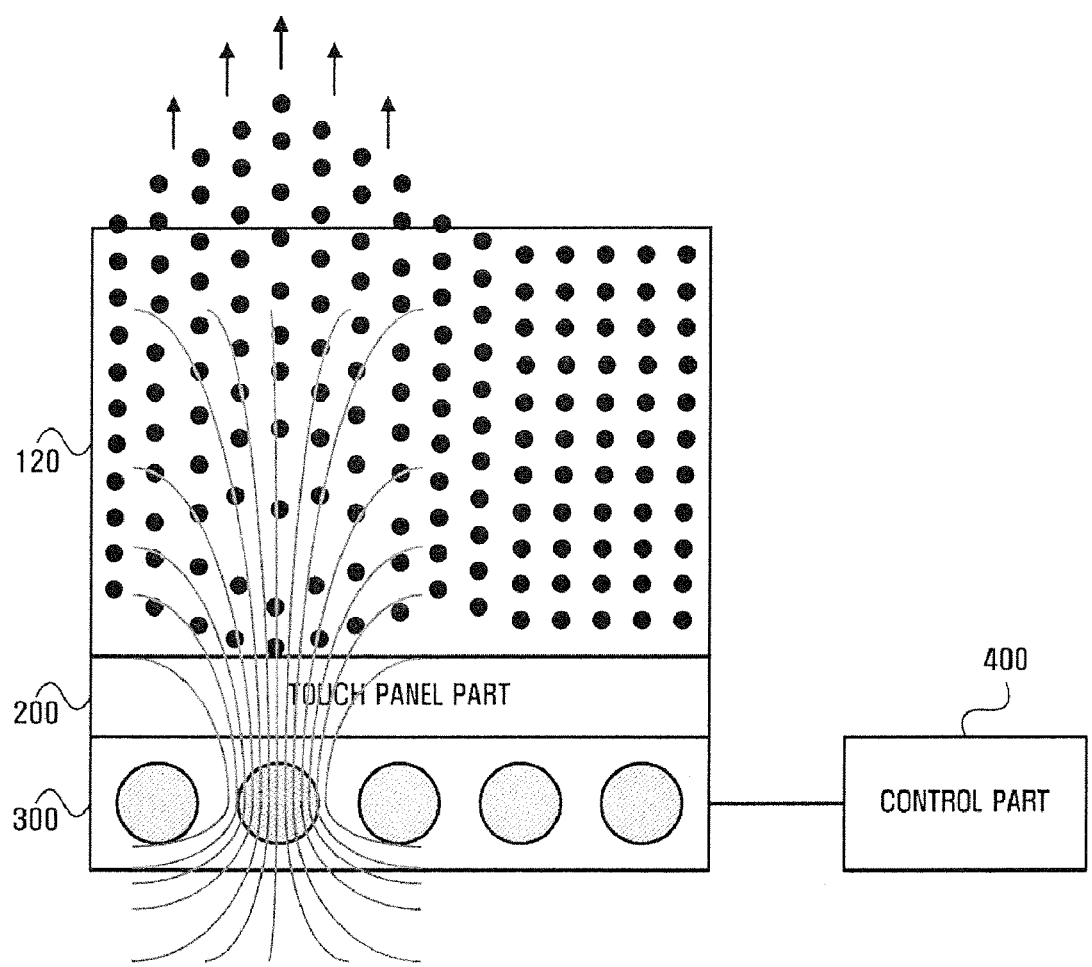
FIG. 6 is a view explaining a case were magnetic fluid raises upward as the magnetic fluid has magnetism according to an embodiment of the present invention.

Now, with reference to FIGS. 4 to 6, an operation of the magnetic fluid will be described. FIG. 4 is a view explaining a distribution of magnetic fluid before a voltage is applied to an electromagnet arrangement part according to an embodiment of the present invention. FIG. 5 is a view explaining a case where a voltage is applied to an electromagnet arrangement part and a magnetic force is generated according to an embodiment of the present invention. FIG. 6 is a view explaining a case where the magnetic fluid raises upward as the magnetic fluid has magnetism according to an embodiment of the present invention.

In FIG. 4, since no voltage is applied to the electromagnet arrangement part 300, the particles of the magnetic fluid 120 have a uniform and stable distribution. In this state, if a user pushes a specified point or performs a scroll operation in a certain direction using his/her finger or an input tool (such as a stylus pen), the touch panel part 200 receives a user input command and calculates a corresponding coordinate value. Since the process of calculating the coordinate value has been described, a detailed description thereof will be omitted.

When the calculated coordinate value on the screen is transferred to the control part 400 as an input value, the control unit 400 determines an electromagnet existing at or nearest to the corresponding point using the coordinate value, and applies a voltage to the electromagnet. In this case, as illustrated in FIG. 5, a magnetic force is generated in a vertical direction from the electromagnet (e.g., the second electromagnet from left in FIG. 5). Although the voltage is described as applied to only one electromagnet, it is understood that aspects of the present invention are not limited thereto. For example, according to other aspects, the voltage may be applied to two or more electromagnets to generate magnetic forces when the input portion corresponds to a point or corresponds to a certain surface.

As illustrated in FIG. 6, the particles of the magnetic fluid 120 are magnetized by the magnetic force to move in accordance with the shape of the line of magnetic force. In this state, respective particles have N polarities and S polarities, respectively, and due to these polarities, repulsion forces act among the particles to make the portion corresponding to the input point project convexly. Here, in accordance with the integrity of the electromagnets, the strength of the magnetic force may differ.

The present embodiment has been described such that if one point is touched on a touch screen, the corresponding point projects in the form of a button. However, it is understood that aspects of the present invention are not limited thereto. For example, in the case of a successive drag operation such as a scrolling, a scrolled portion may project successively.

FIG. 7 is a flowchart illustrating a display method of sensing an input point using magnetic fluid according to an embodiment of the present invention. Referring to FIG. 7, a coordinate value in accordance with a user input command is received on a touch panel device having magnetic fluid 120 in operation S102. One or more electromagnets corresponding to the input coordinate value in the electromagnet arrangement part 300 provided under the touch panel part 200 are determined in operation S104, and a magnetic force is generated by applying a voltage to the determined one or more electromagnets in operation S106. Accordingly, the distribution of the magnetic fluid in the portion corresponding to the input coordinate value is changed due to the generated magnetic force in operation S108, and the corresponding portion projects due to the repulsion forces acting among the particles of the magnetic fluid of the corresponding portion in operation S110.

As described above, the display device and method of sensing an input point using magnetic fluid according to aspects of the present invention has at least one of the following advantages. If a user input is made on a touch screen, the user can feel a resistance from a magnetic force through magnetic fluid, instead of receiving a feedback through an existing screen or sound. Thus, a similar effect to a pushing of a mechanical switch can be obtained. In addition, since the user can immediately recognize whether the input through the touch panel has been accurately made, a user's input convenience can be improved, and a user's sensitivity can be stimulated. Furthermore, the device according to aspects of the present invention can be applied to games or visual equalizers using touch inputs in addition to the input device.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display device to sense an input point using magnetic fluid, the display device comprising:
   a touch panel part to receive a user input through a touch at an input point and to calculate a coordinate value of the input point;
   an electromagnet arrangement part comprising a plurality of electromagnets to generate a magnetic force on one or more electromagnets in a portion corresponding to the coordinate value;
   a magnetic fluid part to become magnetized at the portion corresponding to the coordinate value and to project in accordance with the generated magnetic force; and
   a control part to receive the calculated coordinate value, to determine the one or more electromagnets corresponding to the coordinate value in the electromagnet arrangement part, and to apply a voltage to the determined one or more electromagnets so that the one or more electromagnets generate the magnetic force,
   wherein the electromagnet arrangement part is an electromagnet array,
   wherein the electromagnet array is not substantially magnetized when the control part does not apply the voltage, and
   wherein the projected magnetic fluid part moves away from a plane of the display device in accordance with the generated magnetic force.

2. The display device as claimed in claim 1, wherein:
   the magnetic fluid part forms a uniform distribution of particles of the magnetic fluid when the electromagnet arrangement part does not generate the magnetic force; and
   when the electromagnet arrangement part generates the magnetic force, a particle distribution of the portion corresponding to the coordinate value is changed by the magnetic force, and the portion projects by repulsion forces acting among the particles.

3. The display device as claimed in claim 1, wherein the magnetic fluid part comprises magnetic fluid having a particle distribution that changes according to the magnetic force, and a protection film protecting the magnetic fluid.

4. The display device as claimed in claim 1, wherein the electromagnet arrangement part generates the magnetic force having a strength corresponding to an integrity of the plurality of electromagnets of the electromagnet arrangement part.

5. The display device as claimed in claim 1, wherein the touch panel part comprises:
   a first electrode and a second electrode with a gap interposed therebetween; and
   an image display part to calculate the coordinate value by sensing an electric signal generated by a contact between the first electrode and the second electrode.

6. The display device as claimed in claim 5, wherein the image display part is provided below the first electrode and the second electrode in a direction of the touch.

7. The display device as claimed in claim 5, wherein the touch panel part further comprises a plastic film to receive the user input through the touch.

8. The display device as claimed in claim 1, wherein the display device is arranged in an order of the magnetic fluid part then the touch panel part in a direction of the touch.

9. The display device as claimed in claim 1, wherein the display device is arranged in an order of the touch panel part then the electromagnetic arrangement part in a direction of the touch.

10. The display device as claimed in claim 1, wherein the input point is a scroll portion generated by a dragging touch.

11. The display device as claimed in claim 1, wherein the magnetic fluid part is not projecting when the electromagnet arrangement part does not generate the magnetic force.

12. A display method of sensing an input point using magnetic fluid, comprising:
    receiving a coordinate value according to a user input on a touch panel device having magnetic fluid;
    determining one or more electromagnets corresponding to the coordinate value in an electromagnet arrangement part comprising a plurality of electromagnets;
    generating a magnetic force by applying a voltage to the determined one or more electromagnets; and
    changing a distribution of the magnetic fluid at the portion corresponding to the coordinate value in accordance with the generated magnetic force such that the magnetic fluid at the portion projects according to repulsion forces acting among particles of the magnetic fluid at the portion,
    wherein the electromagnet arrangement part is an electromagnet array,
    wherein the electromagnet array is not substantially magnetized without applying the voltage, and
    wherein the projected magnetic fluid at the portion moves away from a plane of the touch panel device according to the repulsion forces.

13. The display method as claimed in claim 12, wherein:
    the magnetic fluid has a uniform distribution of particles when the magnetic fluid is not magnetized; and
    a particle distribution of the portion of the magnetic fluid corresponding to the coordinate value changes when the magnetic fluid is magnetized, and the portion projects by repulsion forces acting among the particles.

14. The display method as claimed in claim 12, wherein the electromagnet arrangement part generates the magnetic force having a strength corresponding to an integrity of the plurality of electromagnets of the electromagnet arrangement part.

15. The display method as claimed in claim 12, wherein the receiving of the coordinate value comprises calculating the coordinate value by sensing an electric signal generated by a contact between a first electrode and a second electrode of the touch panel device.

16. The display method as claimed in claim 12, wherein the user input is a dragging touch, and the coordinate value corresponds to a scroll portion generated by the dragging touch.

17. The display method as claimed in claim 12, wherein the touch panel device comprises a plastic film to receive the user input through a touch.

18. A non-transitory computer readable recording medium encoded with the method of claim 12 and implemented by a computer.

19. A computing apparatus to sense an input point using magnetic fluid, the computing apparatus comprising:
    a display device to receive a user input, the display device comprising:
       a touch panel part to receive the user input through a touch at an input point and to calculate a coordinate value of the input point,
       an electromagnet arrangement part comprising a plurality of electromagnets to generate a magnetic force on one or more electromagnets in a portion corresponding to a coordinate value of the input point, and
       a magnetic fluid part to become magnetized at the portion corresponding to the coordinate value and to project in accordance with the generated magnetic force; and
    a control part to calculate the coordinate value of the input point, to determine the one or more electromagnets corresponding to the coordinate value in the electromagnet arrangement part, and to apply a voltage to the determined one or more electromagnets so that the one or more electromagnets generate the magnetic force, wherein the electromagnet arrangement part is an electromagnet array, wherein the electromagnet array is not substantially magnetized when the control part does not apply the voltage, and wherein the projected magnetic fluid part moves away from a plane of the display device in accordance with the generated magnetic force.

20. The computing apparatus as claimed in claim 19, wherein:

the magnetic fluid part forms a uniform distribution of particles of the magnetic fluid when the electromagnet arrangement part does not generate the magnetic force; and when the electromagnet arrangement part generates the magnetic force, a particle distribution of the portion corresponding to the coordinate value is changed by the magnetic force, and the portion projects by repulsion forces acting among the particles.

21. The computing apparatus as claimed in claim 19, wherein the magnetic fluid part comprises magnetic fluid having a particle distribution that changes according to the magnetic force, and a protection film protecting the magnetic fluid.

22. The computing apparatus as claimed in claim 19, wherein the touch panel part comprises:

a first electrode and a second electrode with a gap interposed therebetween; and an image display part to calculate the coordinate value by sensing an electric signal generated by a contact between the first electrode and the second electrode.

23. A display device to sense an input point using magnetic fluid, the display device comprising:

a touch panel part to receive a user input through a touch at an input point;

an electromagnet arrangement part comprising a plurality of electromagnets to generate a magnetic force on one or more electromagnets in a portion corresponding to the input point; and a magnetic fluid part to become magnetized at the portion corresponding to the input point and to project in accordance with the generated magnetic force; and a control part to calculate the coordinate value of the input point, to determine the one or more electromagnets corresponding to the coordinate value in the electromagnet arrangement part, and to apply a voltage to the determined one or more electromagnets so that the one or more electromagnets generate the magnetic force, wherein the electromagnet arrangement part is an electromagnet array, wherein the electromagnet array is not substantially magnetized without applying the voltage, and wherein the projected magnetic fluid part moves away from a plane of the display device in accordance with the generated magnetic force.

24. The display device as claimed in claim 23, wherein:

the magnetic fluid part forms a uniform distribution of particles of the magnetic fluid when the electromagnet arrangement part does not generate the magnetic force; and when the electromagnet arrangement part generates the magnetic force, a particle distribution of the portion corresponding to the input point is changed by the magnetic force, and the portion projects by repulsion forces acting among the particles.

25. The display device as claimed in claim 23, wherein the magnetic fluid part comprises magnetic fluid having a particle distribution that changes according to the magnetic force, and a protection film protecting the magnetic fluid.

26. The display device as claimed in claim 23, wherein the touch panel part comprises:

a first electrode and a second electrode with a gap interposed therebetween; and an image display part to determine the input point by sensing an electric signal generated by a contact between the first electrode and the second electrode.

\* \* \* \* \*